US011872757B2

(12) United States Patent
Champion et al.

(10) Patent No.: US 11,872,757 B2
(45) Date of Patent: *Jan. 16, 2024

(54) MICROWAVE ENERGY EMITTERS WITH TIPS

(71) Applicant: Hewlett-Packard Development Company, L.P., Spring, TX (US)

(72) Inventors: David A. Champion, Corvallis, OR (US); Douglas Pederson, Corvallis, OR (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 64 days.

This patent is subject to a terminal disclaimer.

(21) Appl. No.: 17/052,087

(22) PCT Filed: Oct. 30, 2018

(86) PCT No.: PCT/US2018/058269
§ 371 (c)(1),
(2) Date: Oct. 30, 2020

(87) PCT Pub. No.: WO2020/091743
PCT Pub. Date: May 7, 2020

(65) Prior Publication Data
US 2021/0245434 A1    Aug. 12, 2021

(51) Int. Cl.
*B29C 64/264*    (2017.01)
*B33Y 30/00*    (2015.01)
(Continued)

(52) U.S. Cl.
CPC ............ *B29C 64/264* (2017.08); *B22F 10/85* (2021.01); *B28B 1/001* (2013.01);
(Continued)

(58) Field of Classification Search
CPC ..... B29C 64/264; B29C 64/393; B33Y 30/00; B33Y 50/02; B22F 10/85; B22F 12/41; B28B 1/001; B28B 17/0081
See application file for complete search history.

(56) References Cited

U.S. PATENT DOCUMENTS

2014/0077417 A1 * 3/2014 Fifield ................ B29C 35/0805
425/174
2015/0042017 A1 * 2/2015 Ramaswamy ........ C23C 26/02
264/483

(Continued)

FOREIGN PATENT DOCUMENTS

WO    WO-2016075563 A1    5/2016
WO    WO-2017131709 A1    8/2017
WO    WO-2017184127 A1 * 10/2017    ............ B22F 1/0059

OTHER PUBLICATIONS

International Search Report and Written Opinion dated Jul. 11, 2019, PCT Patent Application No. PCT/US2018/058269, filed Oct. 30, 2018, Federal Institute of Industrial Property, Moscow, Russia, 9 pages.

*Primary Examiner* — Joseph S Del Sole
*Assistant Examiner* — Xinwen Ye
(74) *Attorney, Agent, or Firm* — SHOOK, HARDY & BACON L.L.P.

(57) ABSTRACT

According to examples, an apparatus may include an agent delivery device to deliver a coalescing agent to selected locations of a build material layer and a plurality of microwave energy emitters, each of the microwave energy emitters including a tip to generate a focused microwave energy field onto a respective area near the tip, in which the tip is to be positioned to place a portion of the build material layer within the focused microwave energy field. The apparatus
(Continued)

may also include a controller that may control the microwave energy emitters to direct microwave energy onto the build material layer.

14 Claims, 5 Drawing Sheets

(51) Int. Cl.
| | | |
|---|---|---|
| *B29C 64/393* | (2017.01) | |
| *B22F 10/85* | (2021.01) | |
| *B28B 1/00* | (2006.01) | |
| *B28B 17/00* | (2006.01) | |
| *B22F 12/41* | (2021.01) | |
| *B22F 10/14* | (2021.01) | |
| *B22F 10/73* | (2021.01) | |
| *B22F 12/10* | (2021.01) | |
| *B22F 12/60* | (2021.01) | |
| *B33Y 50/02* | (2015.01) | |

(52) U.S. Cl.
CPC ........ *B28B 17/0081* (2013.01); *B29C 64/393* (2017.08); *B33Y 30/00* (2014.12); *B33Y 50/02* (2014.12); *B22F 10/14* (2021.01); *B22F 10/73* (2021.01); *B22F 12/10* (2021.01); *B22F 12/41* (2021.01); *B22F 12/60* (2021.01)

(56) References Cited

U.S. PATENT DOCUMENTS

| | | | |
|---|---|---|---|
| 2015/0054204 A1 | 2/2015 | Tseliakhovich et al. | |
| 2016/0230283 A1 | 8/2016 | Tseliakhovich et al. | |
| 2016/0243619 A1* | 8/2016 | Gothait | C09D 11/033 |
| 2016/0279707 A1* | 9/2016 | Mattes | B22F 10/20 |
| 2017/0125909 A1* | 5/2017 | Pance | H01Q 9/0485 |
| 2017/0246761 A1* | 8/2017 | Champion | B33Y 50/02 |
| 2017/0256849 A1 | 9/2017 | Cohen | |
| 2017/0304895 A1* | 10/2017 | Porch | B33Y 50/02 |
| 2017/0326816 A1 | 11/2017 | Seepersad et al. | |
| 2018/0022923 A1 | 1/2018 | Emamjomeh et al. | |
| 2018/0193955 A1* | 7/2018 | Karp | B29C 64/282 |

* cited by examiner

MICROWAVE ENERGY EMITTERS WITH TIPS

CLAIM FOR PRIORITY

The present application is a national stage filing under 35 U.S.C 371 of PCT application number PCT/US2018/058269, having an international filing date of Oct. 30, 2018, the disclosure of which is hereby incorporated by reference in its entirety.

BACKGROUND

In three-dimensional (3D) printing, an additive printing process may be used to make three-dimensional solid parts from a digital model. 3D printing may be used in rapid product prototyping, mold generation, mold master generation, and manufacturing. Some 3D printing techniques are considered additive processes because they involve the application of successive layers of material to an existing surface (template or previous layer). This is unlike traditional machining processes, which often rely upon the removal of material to create the final part. 3D printing may involve curing or fusing of the building material, which for some materials may be accomplished using heat-assisted melting, fusing, sintering, or otherwise coalescing, and then solidification, and for other materials may be performed through UV curing of polymer-based build materials or UV or thermally curable agents.

BRIEF DESCRIPTION OF THE DRAWINGS

Features of the present disclosure are illustrated by way of example and not limited in the following figure(s), in which like numerals indicate like elements, in which.

DETAILED DESCRIPTION

Figure 1:
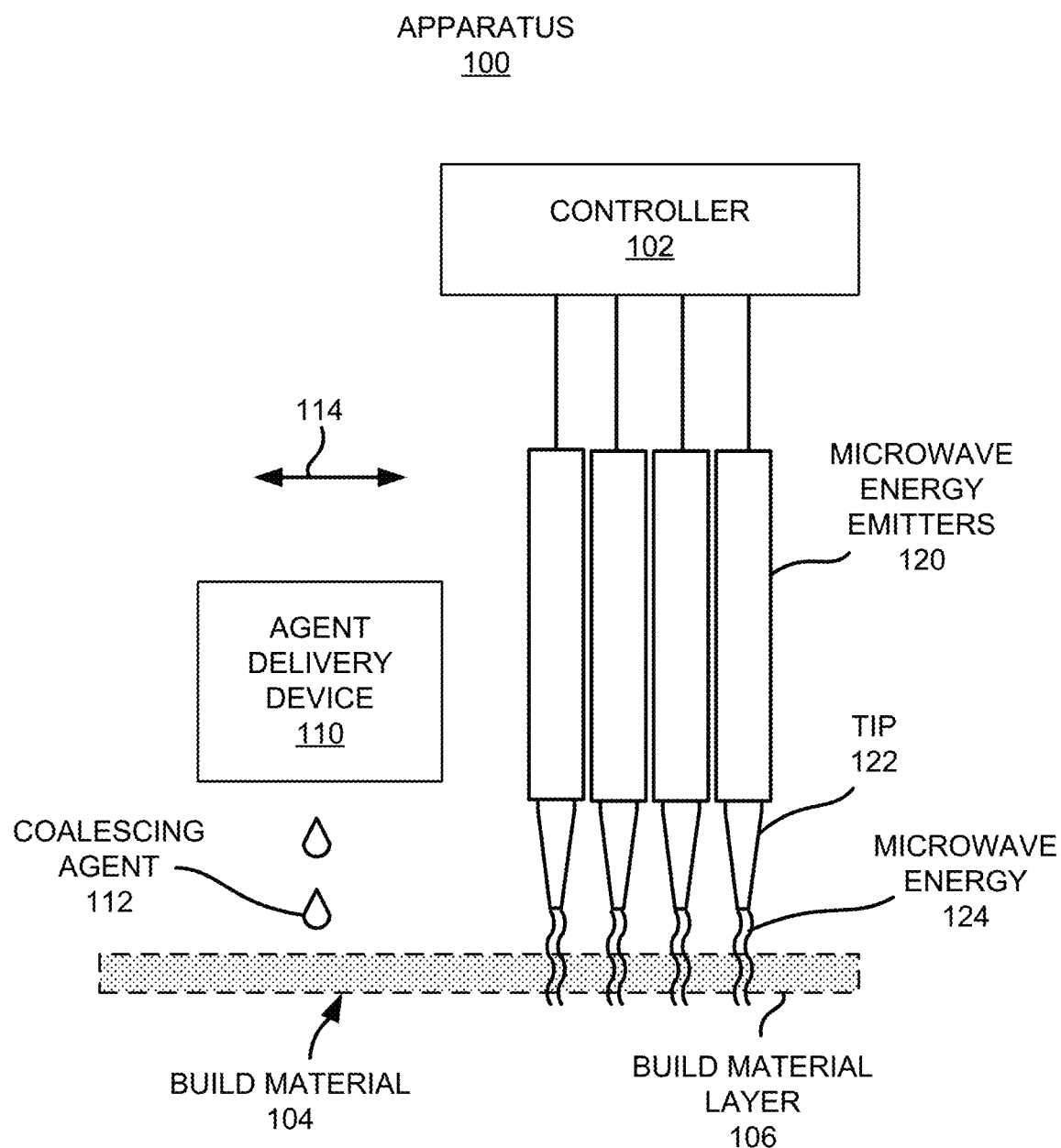
FIG. 1 shows a diagram of an example apparatus that may include a plurality of microwave energy emitters having tips to generate focused microwave energy fields for focused build material coalescing.

Some types of three-dimensional (3D) fabrication systems may apply energy onto build material to cause the build material at selected locations to be selectively coalesced, e.g., to form part of a 3D object. In addition, the build material that is not in the selected locations may be recycled and reused in a future fabrication operation. Although the un-coalesced build material may not have received sufficient energy, for instance, to begin to melt, the application of energy onto that build material may still cause some degradation in the build material. As such, when the build material is recycled and used in a future fabrication operation, the parts formed using the build material may have structural and/or cosmetic defects.

Disclosed herein are apparatuses and methods that may reduce or limit the amount of energy that the build material that is not used for generating an object may absorb during a fabrication operation. As a result, the build material that is not used for generating an object may be recycled and reused in a future fabrication operation with a lower amount of degradation as compared with other types of fabrication operations that may use, for instance, infrared heating. Particularly, the apparatuses disclosed herein may include a plurality of microwave energy emitters, each of which having a respective tip to generate a focused microwave energy field. The microwave energy emitters may be arranged in an array that may span across a large swath of a build material layer. In addition, the microwave energy emitters may be controlled such that selected ones of the microwave energy emitters may emit microwave energy at a given time to thus control the locations on a build material layer that may receive the microwave energy as, for instance, the microwave energy emitters are scanned across the build material layer.

The tips of the microwave energy emitters may also be positioned in relatively close proximity to the build material layer such that the build material layer may be within the microwave energy fields generated at the tips of the microwave energy emitters. Through selective application of microwave energy, e.g., onto the build materials at the locations of the build material layer that are to be coalesced, the build materials outside of those locations may receive a reduced or no microwave energy. As such, the build material outside of those locations may absorb little to no microwave energy and may thus remain below certain temperatures, e.g., their melting point temperatures, coalescing agent curing temperatures, or the like.

According to examples, the frequency and/or wavelength of the microwave energy may be selected such that the build material upon which the microwave energy has been emitted may absorb a little to no amount of the microwave energy. In other words, the frequency and/or wavelength of the microwave energy may be selected such that a large portion or most of the microwave energy passes through the build material. In addition, a coalescing agent may be selected that sufficiently absorbs the microwave energy to cause the build material upon which the coalescing agent has been applied to coalesce.

As the microwave energy may pass through the build material, the coalescing agent applied on a previous build material layer may absorb the microwave energy as the microwave energy is applied to the coalescing agent on a current layer. As a result, the coalescing agent on the previous layer may continue to absorb the microwave energy, which may increase coalescence among the build material in the previous layer and the current layer. In other words, the application of microwave energy as discussed herein may improve reptation between the previous layer and the current layer, which may improve bonding between build material in multiple layers.

Before continuing, it is noted that as used herein, the terms "includes" and "including" mean, but is not limited to, "includes" or "including" and "includes at least" or "including at least." The term "based on" means "based on" and "based at least in part on." In addition, references herein to melted particles may also be defined as including at least partially melted particles.

Figure 2:
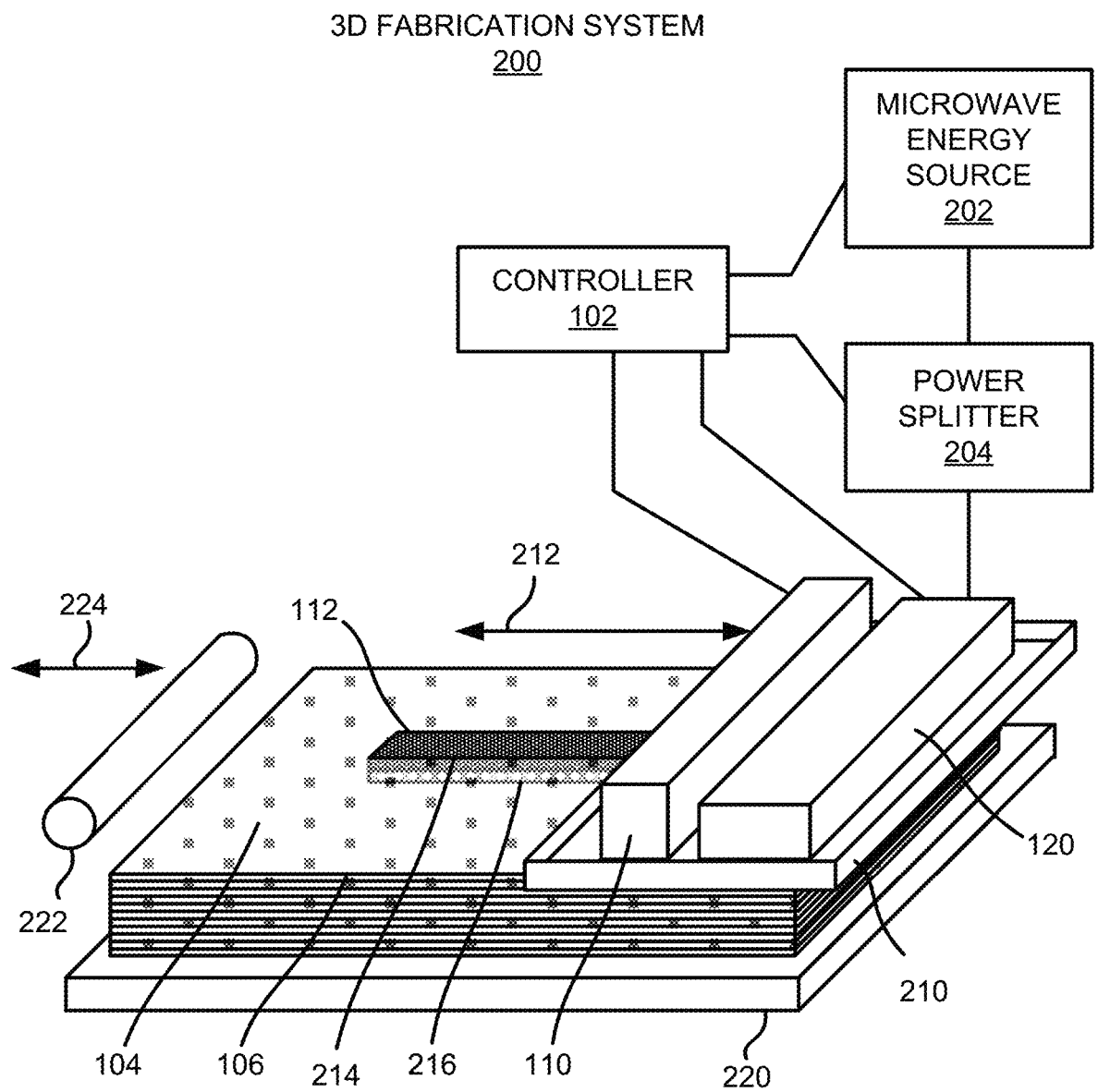
FIG. 2 shows a diagram of an example 3D fabrication system that may include the components of the apparatus depicted in FIG. 1.

Reference is first made to FIGS. 1 and 2. FIG. 1 shows a diagram of an example apparatus 100 that may include a plurality of microwave energy emitters having tips to generate focused microwave energy fields for focused build material coalescing. FIG. 2 shows a diagram of an example 3D fabrication system 200 that may include the components of the apparatus 100 depicted in FIG. 1. It should be understood that the apparatus 100 depicted in FIG. 1 and the 3D fabrication system 200 depicted in FIG. 2 may include additional components and that some of the components described herein may be removed and/or modified without departing from the scopes of the apparatus 100 and/or the 3D fabrication system 200 disclosed herein.

As shown in FIG. 1, the apparatus 100, which may also be a 3D fabrication system, may include a controller 102, which may be a computing device. In some examples, the controller 102 may be a semiconductor-based microprocessor, a central processing unit (CPU), an application specific integrated circuit (ASIC), a field-programmable gate array (FPGA), and/or other suitable hardware device. In some examples, the controller 102 may be separate from the apparatus 100 and/or the 3D fabrication system 200 while in other examples, the controller 102 may be incorporated with the apparatus 100 and/or the 3D fabrication system 200. The apparatus 100 and/or the 3D fabrication system 200 may also be termed a 3D printer, a 3D fabricator, or the like, and may be implemented to fabricate 3D objects from build material 104 as discussed herein.

The build material 104 may be formed into a build material layer 106 and the apparatus 100 and/or the 3D fabrication system 200 may cause build material 104 at selected locations of the build material layer 106 to coalesce. The selected locations of the build material layer 106 may include the locations that are to be coalesced to form a part of a 3D object or parts of multiple 3D objects in the build material layer 106. By selectively coalescing the build material 104 at selected locations on multiple build material layers 106, the parts of the 3D object or 3D objects may be fabricated as intended. As used herein, the term "coalesce" may be defined as being joined together through melting and subsequent fusing, through curing of a binder, etc.

As also shown in FIGS. 1 and 2, the apparatus 100 and the 3D fabrication system 200 may include an agent delivery device 110 that may deliver a coalescing agent 112 to the selected locations of the build material layer 106. For instance, the controller 102 may control the agent delivery device 110 to selectively deliver the coalescing agent 112 at the selected locations as the agent delivery device 110 is scanned across the build material layer 106 as denoted by the arrow 114. The apparatus 100 and the 3D fabrication system 200 may also include a plurality of microwave energy emitters 120, in which each of the microwave energy emitters 120 may include a tip 122 to generate a focused energy field 124 at a respective area near the tip 122. The tip 122 may be positioned sufficiently close to the build material layer 106 to place a portion of the build material layer 106 within the generated focused energy field 124. In addition, the tip 122 may have a relatively small diameter, e.g., between about 2 mm and about 4 mm, to focus the microwave energy 124.

According to examples, the energy 124 may be in the form of electromagnetic radiation. The electromagnetic radiation may have a wavelength that may be between about 1 meter and about one millimeter and may have a frequency that may be between about 300 MHz and about 300 GHz. As such, for instance, the energy 124, which is also referenced herein as microwave energy, may be in the microwave wavelength.

According to examples, the 3D fabrication system 200 may include a microwave energy source 202 that may supply energy (which may equivalently be termed signals) to the microwave energy emitters 120, in which power levels of the microwave energy emitted by the microwave energy emitters 120 may correspond to the power levels of the supplied energy. The microwave energy source 202 may include any suitable device that may generate microwave energy, such as a magnetron or multiple magnetrons, and may supply the generated energy to the microwave energy emitters 120 via a power splitter 204. The power splitter 204 may split the energy supplied from the microwave energy source 202 to each of the microwave energy emitters 120 such that the microwave energy emitters 120 may receive the same amount of energy with respect to each other. According to examples, the controller 102 may control the power splitter 204 to control which of the microwave energy emitters 120 are supplied with the energy at any given time. The microwave energy emitters 120 to which energy has been supplied may cause the focused energy field 124 to be generated near the tips 122 of the microwave energy emitters 120.

The coalescing agent 112 may be a substance that may cause the build material 104 on which the coalescing agent 112 has been applied to coalesce when energy, e.g., energy in the microwave wavelength, is applied to the coalescing agent 112. The coalescing agent 112 may be applied through use of a suitable agent delivery device 110. In addition, the locations at which the coalescing agent 112 may be applied may be areas of the build material layers 106 that may be coalesced to form portions of a 3D object or portions of multiple 3D objects, based, for example, on a 3D object model of an object to be fabricated. As such, multiple layers 106 may include selected areas of coalesced build material 104, such that the selectively coalesced build material 104 in the layers 106 may form the 3D object or objects.

According to examples, the coalescing agent 112 may enhance absorption of microwave energy from a plurality of microwave energy emitters 120 to heat the build material 104 to a temperature that is sufficient to cause the build material 104 upon which the coalescing agent 112 has been deposited to melt, fuse, cure, sinter, cause a reaction with another material, or otherwise coalesce prior to or as part of being joined. In addition, or alternatively, the coalescing agent 112 may be a binder that may absorb the microwave energy to become cured and thus cause the build material 104 upon which the coalescing agent 112 has been applied to become joined together as the coalescing agent 112 is cured. In addition, the microwave energy emitters 120 may apply energy at a level (and/or a wavelength) that may cause the build material 104 upon which the coalescing agent 112 has been applied to be coalesced without causing the build material 104 upon which the coalescing agent 112 has not been applied to be coalesced.

According to one example, a suitable coalescing agent 112 may be an ink-type formulation including carbon black, such as, for example, the coalescing agent 112 formulation commercially known as V1Q60A "HP fusing agent" available from HP Inc. In one example, such a coalescing agent 112 may additionally include an infra-red light absorber. In one example, such an ink may additionally include a near infra-red light absorber. In one example, such a coalescing agent 112 may additionally include a visible light absorber. In one example, such an ink may additionally include a UV light absorber. Examples of inks including visible light enhancers are dye-based colored ink and pigment-based colored ink, such as inks commercially known as CE039A and CE042A available from HP Inc. According to one example, the coalescing agent 112 may be a low tint fusing agent (LTFA).

In some examples, a detailing agent (not shown) may be applied on the build material layers 106 to assist in the formation of the portions of the 3D object in the build material layers 106. In some examples, the coalescing agent 112 may aid in the coalescing of the build material 104 on which the coalescing agent 112 has been applied while the detailing agent may define the boundaries at which the build material 104 coalesces. According to examples, the detailing agent may be a nonpolar and/or non-microwave absorbing detailing agent such that the application of the microwave energy from the microwave energy emitters 120 may not cause or may cause a relatively small amount of heating of the detailing agent.

The build material 104 may include any suitable material for forming a 3D object including, but not limited to, plastics, polymers, metals, nylons, and ceramics and may be in the form of a powder, a powder-like material, a fluid, a gel, or the like. References made herein to "powder" should also be interpreted as including "power-like" materials. Additionally, in instances in which the build material 104 is in the form of a powder, the build material 104 may be formed to have dimensions, e.g., widths, diameters, or the like, that are generally between about 5 µm and about 100 µm. In other examples, the build material 104 may have dimensions that may generally be between about 30 µm and about 60 µm. The build material 104 may generally have spherical shapes, for instance, as a result of surface energies of the particles in the build material and/or processes employed to fabricate the particles. The term "generally" may be defined as including that a majority of the particles in the build material 104 have the specified sizes and spherical shapes. In other examples, the term "generally" may be defined as a large percentage, e.g., around 80% or more of the particles have the specified sizes and spherical shapes. The build material 104 may additionally or alternatively include short fibers that may, for example, have been cut into short lengths from long strands or threads of material. According to one example, a suitable build material 104 may be PA12 build material commercially known as V1R10A "HP PA12" available from HP Inc.

As further shown in FIG. 2, the 3D fabrication system 200 may include a carriage 210 on which the agent delivery device 110 and the microwave energy emitters 120 may be supported. The carriage 210 may be scanned across the build material layer 106 as denoted by the arrow 212. In some examples, the controller 102 may control the agent delivery device 110 to selectively deliver the coalescing agent 112 to a selected location 214 of the build material layer 106 as the carriage 210 is scanned across the build material layer 106. The selected location 214 may include build material 104 that is to be coalesced to form a portion of a 3D object. In addition, the controller 102 may control the microwave energy emitters 120 to selectively direct energy 124 onto the selected location 214 of the build material layer 106 at which the coalescing agent 112 has been delivered. Although the agent delivery device 110 and the microwave energy emitters 120 are depicted as being supported on the same carriage 210, in other examples, the 3D fabrication system 200 may include multiple carriages 210 and the agent delivery device 110 and the microwave energy emitters 120 may be supported on separate carriages 210 such that the agent delivery device 110 and the microwave energy emitters 120 may separately be scanned across the build material layer 106 with respect to each other.

As shown in FIG. 1, the tips 122 of the microwave energy emitters 120 may be positioned in relatively close proximities to the build material layer 106 such that the build material 104 in the build material layer 106 may be within the energy fields 124 generated from the tips 122. According to examples, the build material 104, frequency, and/or the wavelength of the generated energy 124 may be selected such that the energy 124 may have a minimal heating effect on the build material 104. That is, for instance, the build material 104 may not absorb a large amount of the energy 124 and instead, a majority of the generated energy 124 may pass through the build material 104. As a result, the build material 104 may be maintained at relatively lower temperatures during receipt of the emitted microwave energy 124 as compared with configurations in which another type of energy, e.g., infrared energy, or other energy that the build material 104 may absorb, is applied to the build material 104. In one regard, by maintaining the temperature of the build material 104 relatively lower, the build material 104 may be reused in more fabrication jobs, e.g., recycled, with a lesser degree of degradation that may lead to lower quality builds.

In addition, the coalescing agent 112, frequency, and/or the wavelength of the generated energy 124 may be selected such that the energy 124 may have a large or maximum heating effect on the coalescing agent 112. That is, for instance, the coalescing agent 112 may absorb a large amount of the generated energy 124 and may become heated to a level that may cause the build material 104 on which the coalescing agent 112 has been applied to melt, fuse, sinter, or otherwise coalesce when the energy 124 is applied on the coalescing agent 112, and/or the coalescing agent 112 to be cured. Some of the microwave energy 124 may, however, pass through the coalescing agent 112 and the build material 104 to a layer 106 or to multiple layers 106 beneath a current build material layer 106. As a result, coalescing agent 112 applied to the lower layer 106 or layers 106 may also receive the energy 124 and may be heated while the coalescing agent 112 on a current layer 106 is being heated. The coalescing agent 112 in the lower layer(s) 106 may thus be heated for longer durations of time than during the time at which the lower layer(s) 106 were the current layer(s) 106. This may result in greater reptation between another portion 216 of the 3D object formed in a previous layer 106 that may be underneath a current layer 106 and the portion 214 of the 3D object being formed in the current layer 106, which may result in a stronger bond between the portions 214 and 216.

As also shown in FIG. 2, the 3D fabrication system 200 may also include a build platform 220 and a spreader 222. According to examples, the controller 102 may control the spreader 222 to apply layers 106 of build material 104 on the build platform 220 and the build platform 220 may be moved downward as the layers 106 are applied over the build platform 220. The build material 104 may be supplied between the spreader 222 and the build platform 220 and the spreader 222 may be moved in either or both directions represented by the arrow 224 across the build platform 220 to spread the build material 104 into a layer 106. The layers 106 have been shown as being partially transparent to enable the portions 214 and 216 to be visible. It should, however, be understood that the build material 104 may not be transparent or translucent, but instead, may be opaque.

Although not shown, the 3D fabrication system 200 may include a heater to maintain an ambient temperature of a build envelope or chamber within which the 3D object may be fabricated from the build material 104 at a relatively high temperature. In addition or in other examples, the build platform 220 may be heated to heat the build material 104 to a relatively high temperature. The relatively high temperature may be a temperature near the melting temperature of the build material 104 such that a relatively low level of energy 124 may be applied to selectively coalesce the build material 104 at the selected locations 214, 216. The 3D fabrication system 200 may also include an additional agent delivery device to deliver other agents, such as, for instance, coloring agents to the build material 104.

Figure 3:
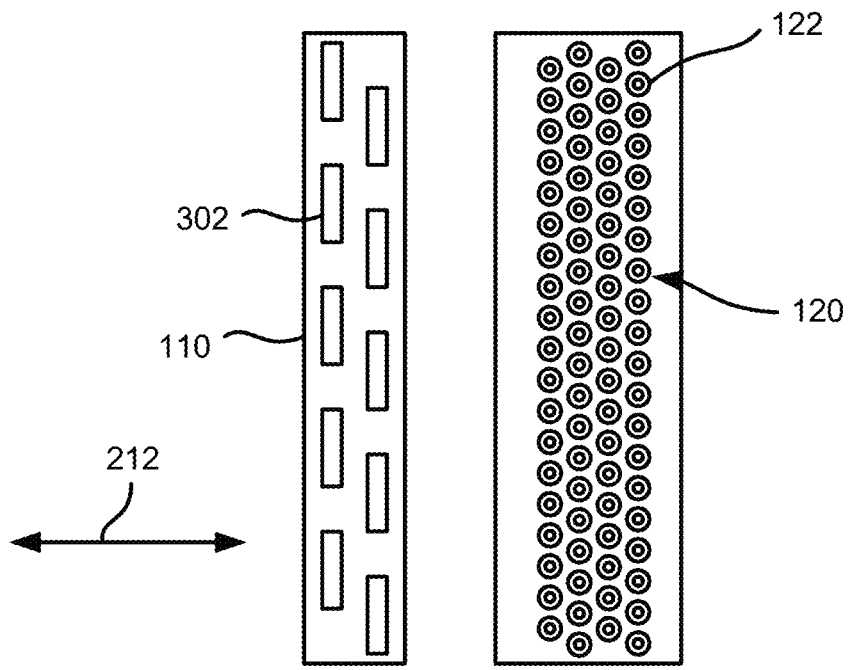
FIG. 3 shows a bottom view of an example agent delivery device and an array of example microwave energy emitters shown in FIGS. 1 and 2.

Turning now to FIG. 3, there is shown a bottom view of an example agent delivery device 110 and an array of example microwave energy emitters 120 shown in FIGS. 1 and 2. It should be understood that the example agent delivery device 110 and the array of example microwave energy emitters 120 depicted in FIG. 3 may include additional components and that some of the components described herein may be removed and/or modified without departing from the scopes of the example agent delivery device 110 and the array of example microwave energy emitters 120 disclosed herein.

As shown, the agent delivery device 110 may include an array of agent delivery mechanisms 302 arranged in a direction that is perpendicular to or nearly perpendicular to the scan direction of the agent delivery device 110 denoted by the arrow 212. As used herein, "nearly perpendicular" may be defined to include angles that are within about 5° of being perpendicular, although other angle ranges may be included in the definition. The agent delivery mechanisms 302 may be arranged in offset columns such that the agent delivery mechanisms 302 in one of the columns maybe offset with respect to the agent delivery mechanisms 302 in another one of the columns. The agent delivery mechanisms 302 in the respective columns may be offset with respect to each other such that the agent delivery device 110 may deliver coalescing agent 112 across a large swath of the build material layer 106. In addition, the agent delivery mechanisms 302 may be individually controllable and may have relatively high resolutions, e.g., 600 dpi, 1200 dpi, or the like. By way of particular example, the agent delivery mechanisms 302 may be thermal inkjet printheads, piezoelectric printheads, or the like.

As also shown, the tips 122 of the microwave energy emitters 120, and thus, the microwave energy emitters 120, may be may be arranged in an array including a plurality of columns of microwave energy emitters 120. The columns of microwave energy emitters 120 may be arranged in a direction that is perpendicular to or nearly perpendicular to the scan direction of the agent delivery device 110 denoted by the arrow 212. The microwave energy emitters 120 may be arranged in offset columns such that the microwave energy emitters 120 in one of the columns maybe offset with respect to the microwave energy emitters 120 in another one of the columns. The microwave energy emitters 120 in the respective columns may be offset with respect to each other such that the microwave energy emitters 120 may emit energy across a large swath of the build material layer 106. In addition, the microwave energy emitters 120 may be individually controllable and may have relatively high resolutions. By way of example, the effective radiation diameters of the microwave energy emitters 120 may be greater than around 2 mm and the tips 122 may be in an array and may have a periodicity of greater than around 4 mm.

Figure 4:
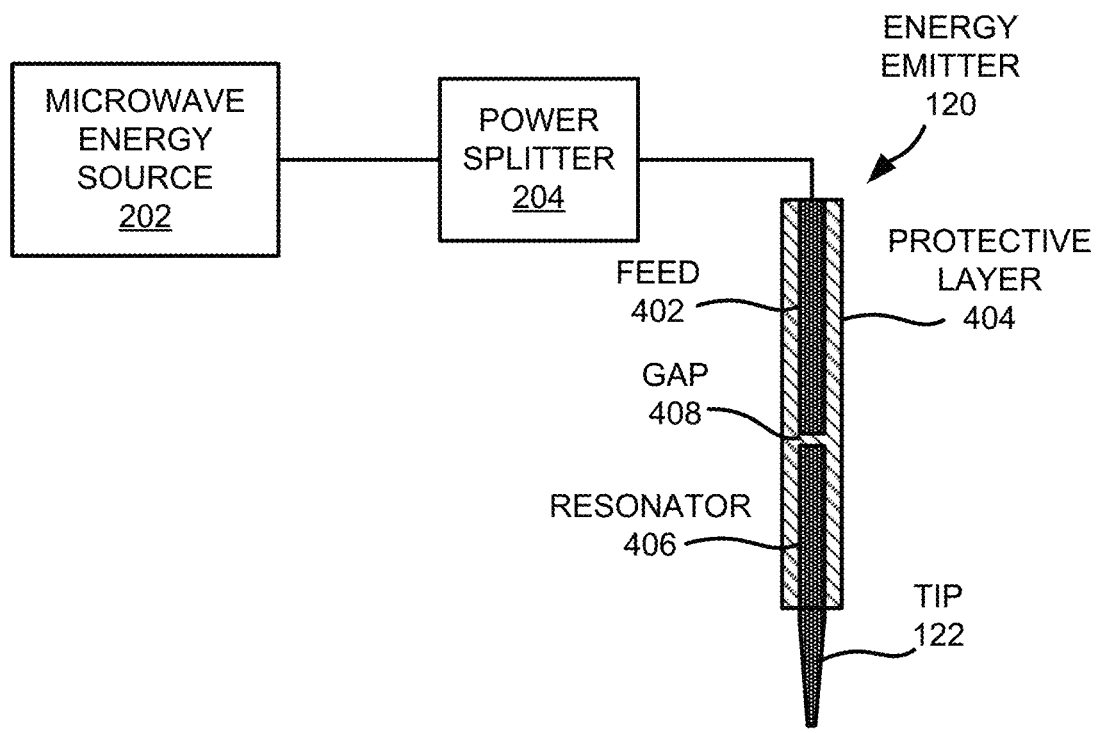
FIG. 4 shows a diagram of an example energy emitter, an example microwave energy source, and an example power splitter.

With reference now to FIG. 4, there is shown a diagram of an example microwave energy emitter 120, an example microwave energy source 202, and an example power splitter 204. It should be understood that the example microwave energy emitter 120, the example microwave energy source 202, and the example power splitter 204 depicted in FIG. 3 may include additional components and that some of the components described herein may be removed and/or modified without departing from the scopes of the example microwave energy emitter 120, the example microwave energy source 202, and the example power splitter 204 disclosed herein. It should also be understood that the other microwave energy emitters 120 may have be similarly configured.

As shown, the microwave energy emitter 120 may include a feed 402, which may be a coax feed. The feed 402 may be connected to the power splitter 204 and may receive microwave energy from the microwave energy source 202 via the connection to the power splitter 204. By way of particular example, the microwave energy source 202 may include three magnetron tubes for the array of microwave energy emitters 120 and the power splitter 204 may provide equal amounts of power to each of the microwave energy emitters 120.

The microwave energy emitter 120 may also include a resonator 406, which may equivalently be termed a coax resonator, housed within a protective layer 404. A gap 408 may be provided between an end of the feed 402 and an end of the resonator 406. As shown, a portion of the protective layer 404 may be positioned in the gap 408, although in other examples, a different type of dielectric material may be provided in the gap 408. The gap 408 may enable the resonator 406 to be capacitively coupled to the feed 402. That is, for instance, the resonator 406 may be coupled to the impedance of the coax with the impedance of the end of the tip 122 having a minimum reflection of energy 124. As a result, the energy 124 may be used for heating the coalescing agent 112 applied on the layer 106 rather than being reflected back to the microwave energy source 202 and dissipated as heat at the microwave energy source 202.

According to examples, the feed 402, the resonator 406, and the tip 122 may be formed of the same type of electrically conductive material or different types of materials with respect to each other. By way of example, the material may include solid copper, stranded copper, copper plated steel wire, and the like.

Figure 5:
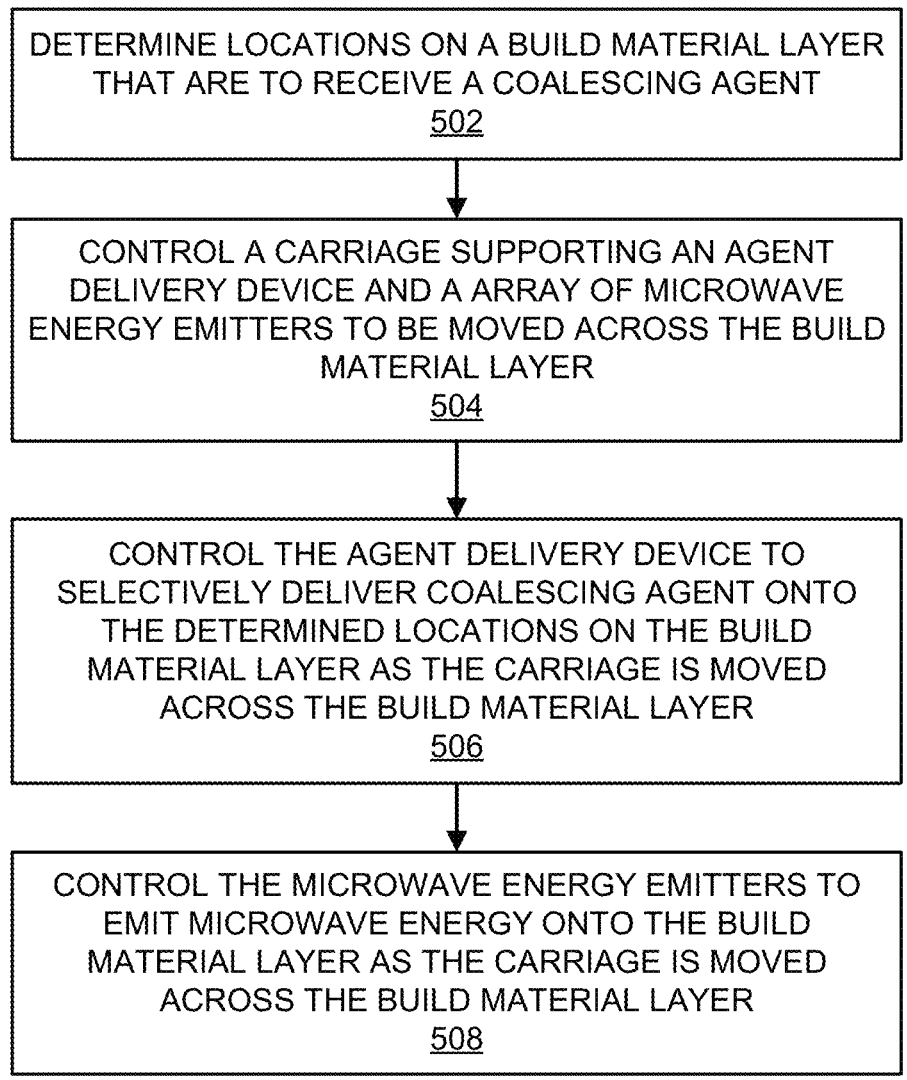
FIGS. 5 and 6, respectively, show flow diagrams of example methods for controlling an array of microwave energy emitters to selectively emit microwave energy onto selected locations on a build material layer.
Figure 6:
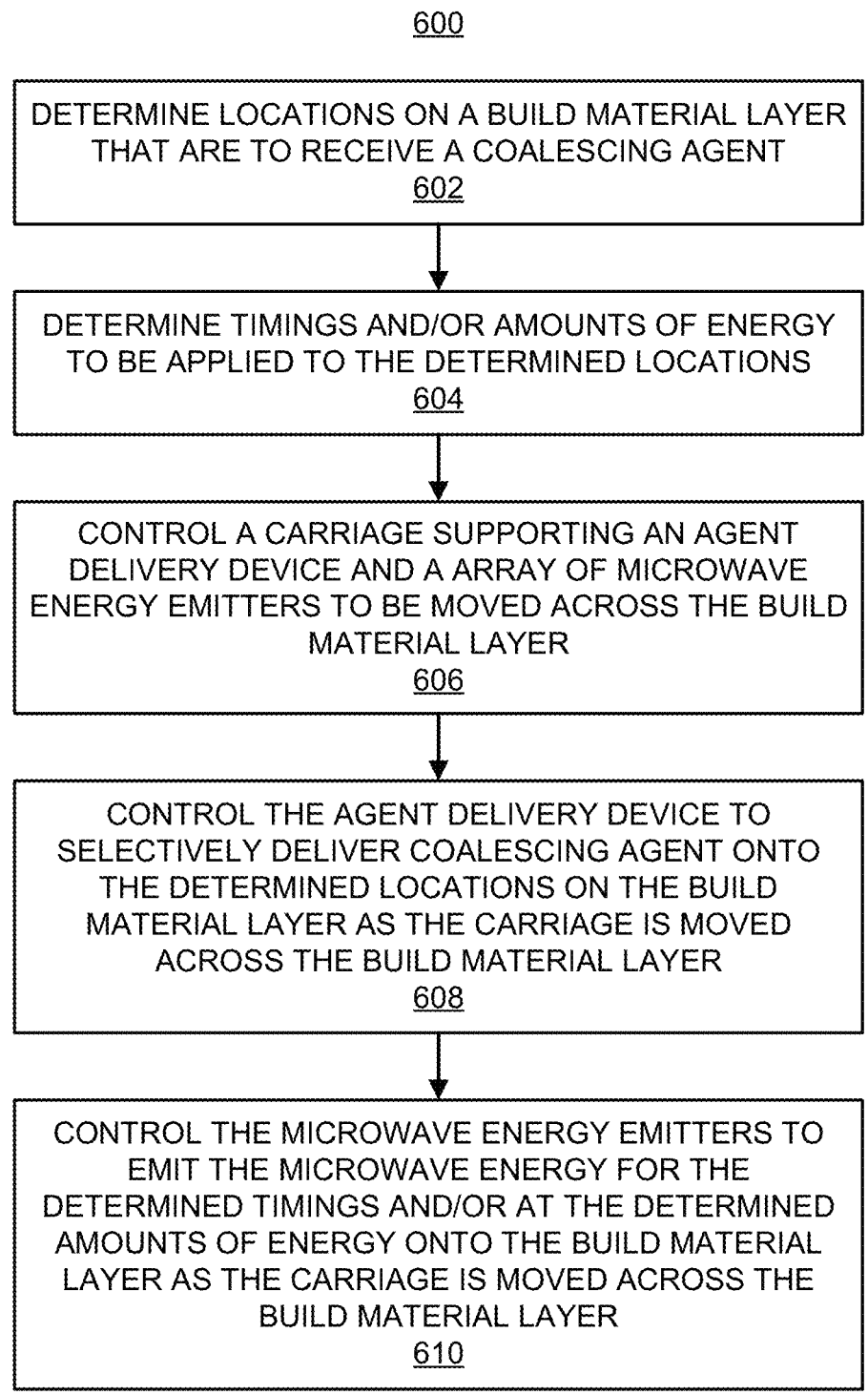

Various manners in which the controller 102 may operate are discussed in greater detail with respect to the methods 500 and 600 respectively depicted in FIGS. 5 and 6. Particularly, FIGS. 5 and 6, respectively, depict flow diagrams of example methods 500 and 600 for controlling an array of microwave energy emitters 120 to selectively emit microwave energy onto selected locations on a build material layer 106. It should be understood that the methods 500 and 600 depicted in FIGS. 5 and 6 may include additional operations and that some of the operations described therein may be removed and/or modified without departing from scopes of the methods 500 and 600. The descriptions of the methods 500 and 600 are made with reference to the features depicted in FIGS. 1-4 for purposes of illustration.

At block 502, the controller 102 may determine locations on a build material layer 106 that are to receive a coalescing agent 112. That is, for instance, the controller 102 may determine the locations 214 on the layer 106 at which build material 104 that is to be coalesced to form part of a 3D object is positioned. The controller 102 may make this determination based on fabrication information of the 3D object obtained from a data file of the 3D object.

At block 504, the controller 102 may control a carriage 210 that may support an agent delivery device 110 and an array of microwave energy emitters 120 to be moved across the build material layer 106. The controller 102 may control an actuator, a motor, or the like, that may cause the carriage 210 to be moved in one of the directions denoted by the arrow 212.

At block 506, the controller 102 may control the agent delivery device 110 to selectively deliver coalescing agent 112 onto the determined locations 214 on the build material layer 106 as the carriage 210 is moved across the build material layer 106. That is, the agent delivery device 110 may be controlled such that the agent delivery mechanisms 302 may selectively be controlled to deliver droplets of the coalescing agent 112 at particular times while the agent delivery device 110 is moved to cause the coalescing agent 112 to accurately be delivered to the determined locations 214. The coalescing agent 112 may be delivered onto the locations based on information pertaining to a slice of a 3D object model.

At block 508, the controller 102 may control the microwave energy emitters 120 in the array of microwave energy emitters 120 to emit microwave energy 124 onto the build material layer 106 as the carriage 210 is moved across the build material layer 106. According to examples, the microwave energy emitters 120 may selectively be controlled to emit microwave energy 124 during particular times while the agent delivery device 110 is moved to cause, for instance, localized delivery of the energy 124 to the locations 214 at which the coalescing agent 112 has been applied. As such, for instance, the microwave energy emitters 120 may limit or reduce emission of the microwave energy 124 onto the build material 104 upon which the coalescing agent 112 has not been applied.

Turning now to FIG. 6, at block 602, the controller 102 may determine locations 214 on a build material layer 106 that are to receive a coalescing agent 112. The controller 102 may make this determination as discussed above with respect to block 502 in FIG. 5.

At block 604, in some examples, the controller 102 may determine timings at which the microwave energy emitters 120 are to be activated to selectively emit microwave energy 124 onto the determined locations. The controller 102 may make this determination based on the determined locations 214 that are to receive the coalescing agent 112. That is, the controller 102 may determine when particular ones of the microwave energy emitters 120 are scheduled to be positioned over the determined locations 214 and to determine that those microwave energy emitters 120 are to be activated, e.g., emit microwave energy 124, at those times. This may include making a determination that multiple ones of the microwave energy emitters 120 positioned along a common axis along the direction denoted by the arrow 212 are to emit microwave energy 124 onto the same location 214 as the microwave energy emitters 120 are moved across the layer 206.

In addition or in other examples, at block 604, the controller 102 may determine amounts of microwave energy 124 to be applied to the determined locations 214. The controller 102 may make this determination based on the determined locations 214 that are to receive the coalescing agent 112. This may include making a determination that multiple ones of the microwave energy emitters 120 positioned along a common axis along the direction denoted by the arrow 212 are to emit microwave energy 124 onto the same location 214 as the microwave energy emitters 120 are moved across the layer 206 to emit the determined amounts of microwave energy 124 onto the determined locations 214.

At block 606, the controller 102 may control a carriage 210 that may support an agent delivery device 110 and an array of microwave energy emitters 120 to be moved across the build material layer 106. The controller 102 may control an actuator, a motor, or the like, that may cause the carriage 210 to be moved in one of the directions denoted by the arrow 212.

At block 608, the controller 102 may control the agent delivery device 110 to selectively deliver coalescing agent 112 onto the determined locations 214 on the build material layer 106 as the carriage 210 is moved across the build material layer 106. The controller 102 may control the agent delivery device 110 as discussed above with respect to block 506 in FIG. 5.

At block 610, the controller 102 may control the microwave energy emitters 120 in the array of microwave energy emitters 120 to emit microwave energy 124 onto the build material layer 106 as the carriage 210 is moved across the build material layer 106. The controller 102 may control the microwave energy emitters 120 as discussed above with respect to block 508 in FIG. 5. In some examples, the controller 102 may control the microwave energy emitters 120 to be activated at times and for durations corresponding to the timings determined at block 604. In some examples, the controller 102 may control the microwave energy emitters 120 to emit the amounts of microwave energy to the determined locations as determined at block 604. In either of these examples, multiple ones of the microwave energy emitters 120 positioned along a common axis along the direction denoted by the arrow 212 may be controlled to emit microwave energy 124 onto the same location 214 as the microwave energy emitters 120 are moved across the layer 206 to emit the determined amounts of microwave energy 124 onto the determined locations 214.

Some or all of the operations set forth in the methods 500 and 600 may each be included as utilities, programs, or subprograms, in any desired computer accessible medium. In addition, the methods 500 and 600 may each be embodied by computer programs, which may exist in a variety of forms both active and inactive. For example, they may exist as machine readable instructions, including source code, object code, executable code or other formats. Any of the above may be embodied on a non-transitory computer readable storage medium.

Examples of non-transitory computer readable storage media include computer system RAM, ROM, EPROM, EEPROM, and magnetic or optical disks or tapes. It is therefore to be understood that any electronic device capable of executing the above-described functions may perform those functions enumerated above.

Although described specifically throughout the entirety of the instant disclosure, representative examples of the present disclosure have utility over a wide range of applications, and the above discussion is not intended and should not be construed to be limiting, but is offered as an illustrative discussion of aspects of the disclosure.

What has been described and illustrated herein is an example of the disclosure along with some of its variations. The terms, descriptions and figures used herein are set forth by way of illustration only and are not meant as limitations. Many variations are possible within the spirit and scope of the disclosure, which is intended to be defined by the following claims—and their equivalents—in which all terms are meant in their broadest reasonable sense unless otherwise indicated.

What is claimed is:

1. An apparatus comprising:
   an agent delivery device that is controllable to deliver a coalescing agent to selected locations of a build material layer;

a plurality of microwave energy emitters, each of the microwave energy emitters including:
a tip that generates a focused microwave energy field onto a respective area beneath and outside of the tip when microwave energy is emitted through a center of the tip, wherein the tip is to be positioned adjacent to a portion of the build material layer that is within the focused microwave energy field;
a resonator, wherein the tip is attached to the resonator;
a coaxial feed that is separated from the resonator by a gap and wherein the resonator is capacitively coupled to the coaxial feed; and
a controller to control the microwave energy emitters to direct microwave energy onto the build material layer.

2. The apparatus of claim 1, further comprising:
a carriage to scan across the build material layer in a first direction, the carriage supporting the plurality of microwave energy emitters.

3. The apparatus of claim 2, wherein the plurality of microwave energy emitters are arranged in an array, the microwave energy emitters in the array extending in a second direction that is perpendicular to the first direction.

4. The apparatus of claim 3, wherein the array includes a plurality of columns of microwave energy emitters, wherein the microwave energy emitters in adjacent columns are offset with respect to each other in the second direction.

5. The apparatus of claim 2, wherein the agent delivery device is supported on the carriage and wherein the controller is to control the microwave energy emitters to selectively direct microwave energy onto the selected locations of the build material layer as the carriage is scanned across the build material layer.

6. The apparatus of claim 1, wherein the coaxial feeds of the energy emitters are connected to a microwave energy source.

7. A three dimensional (3D) fabrication system comprising:
an agent delivery device;
an array of microwave energy emitters, each of the microwave energy emitters including:
a tip that focuses microwave energy emitted from the microwave energy emitter onto a respective area adjacent to and beneath the tip when microwave energy is emitted through the tip;
a resonator, wherein the tip is attached to the resonator;
a coaxial feed that is separated from the resonator by a gap and wherein the resonator is capacitively coupled to the coaxial feed; and
a controller to:
control the agent delivery device to deliver a coalescing agent onto locations of a build material layer including build material that is to be coalesced based on a slice of a 3D object model; and
control the array of microwave energy emitters to emit energy onto the build material layer.

8. The 3D fabrication system of claim 7, wherein the array of microwave energy emitters are to be moved across the build material layer in a first direction to selectively emit microwave energy onto the locations of the build material layer that is to be coalesced.

9. The 3D fabrication system of claim 8, wherein the array of microwave energy emitters includes a plurality of columns of microwave energy emitters, wherein the microwave energy emitters in adjacent columns are offset with respect to each other in a second direction, the second direction being perpendicular or nearly perpendicular to the first direction.

10. The 3D fabrication system of claim 9, wherein the controller is further to:
determine a duration of time at which a location of the build material layer is to receive microwave energy from the array of microwave energy emitters; and
selectively activate a plurality of microwave energy emitters in multiple columns as the microwave energy emitters become positioned to emit microwave energy onto the location during movement of the array of microwave energy emitters across the build material layer.

11. The 3D fabrication system of claim 7, further comprising:
a microwave energy source; and
wherein each of the microwave energy emitters includes:
a resonator and a coaxial feed, the coaxial feed being connected to the microwave energy source, the resonator being capacitively coupled to the coaxial feed, and the tip being attached to the resonator.

12. A method comprising:
determining, by a controller, locations on a build material layer that are to receive a coalescing agent;
controlling, by the controller, a carriage supporting an agent delivery device and an array of microwave energy emitters to be moved across the build material layer;
controlling, by the controller, the agent delivery device to selectively deliver coalescing agent onto the determined locations on the build material layer as the carriage is moved across the build material layer; and
controlling, by the controller, the microwave energy emitters in the array of microwave energy emitters to emit microwave energy onto the build material layer as the carriage is moved across the build material layer, wherein each of the microwave energy emitters includes a resonator having a tip that focuses microwave energy emitted from the microwave energy emitter onto a respective area adjacent to and beneath the tip when microwave energy is emitted through the tips wherein the resonator is capacitively coupled to a coaxial feed that is separated from the resonator by a gap.

13. The method of claim 12, wherein the microwave energy emitters in the array of microwave energy emitters are arranged in multiple offset columns and wherein the method further comprises:
determining timings at which the microwave energy emitters are to be activated to selectively emit microwave energy onto the determined locations and
wherein controlling the microwave energy emitters further comprises controlling the microwave energy emitters to be activated at times and for durations corresponding to the determined timings.

14. The method of claim 12, further comprising:
determining amounts of microwave energy to be applied to the determined locations; and
wherein controlling the microwave energy emitters further comprises controlling the microwave energy emitters to emit the determined amounts of microwave energy to the determined locations.

* * * * *